US012548600B2

(12) United States Patent
Meng et al.

(10) Patent No.: US 12,548,600 B2
(45) Date of Patent: Feb. 10, 2026

(54) METHOD, APPARATUS, DEVICE AND MEDIUM FOR PROCESSING MEDIA ITEM

(71) Applicant: Beijing Zitiao Network Technology Co., Ltd., Beijing (CN)

(72) Inventors: Quan Meng, Beijing (CN); Ruidong Pan, Beijing (CN); Yuzhou Wang, Beijing (CN); Hongwei Kang, Beijing (CN); Xin Yang, Beijing (CN); Qi Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/820,087

(22) Filed: Aug. 29, 2024

(65) Prior Publication Data

US 2025/0378852 A1    Dec. 11, 2025

Related U.S. Application Data

(63) Continuation of application No. PCT/CN2024/097543, filed on Jun. 5, 2024.

(51) Int. Cl.
*G06V 10/82* (2022.01)
*G06T 11/60* (2006.01)
(Continued)

(52) U.S. Cl.
CPC ............ *G11B 27/036* (2013.01); *G06T 11/60* (2013.01); *G06V 10/82* (2022.01); *G06V 20/41* (2022.01); *G06V 20/46* (2022.01); *G06V 20/49* (2022.01)

(58) Field of Classification Search
CPC ....... G11B 27/036; G06T 11/60; G06V 20/49; G06V 20/46; G06V 20/41; G06V 10/82
See application file for complete search history.

(56) References Cited

U.S. PATENT DOCUMENTS 7,836,110 B1 * 11/2010 Schoenbach ........ G06F 16/4393
707/829
2018/0191797 A1    7/2018 Javier et al.
(Continued)

FOREIGN PATENT DOCUMENTS

CN      107360383 A    11/2017
CN      110795925 A     2/2020
(Continued)

OTHER PUBLICATIONS

ISA China National Intellectual Property Administration, International Search Report Issued in Application No. PCT/CN2024/097543, Jun. 21, 2024, 3 pages.

*Primary Examiner* — Thai Q Tran
*Assistant Examiner* — Jose M Mesa
(74) *Attorney, Agent, or Firm* — Alleman Hall LLP

(57) ABSTRACT

Methods, apparatuses, devices, and media are provided for processing media items. A first media item and a plurality of templates are obtained, the plurality of templates being used for generating a plurality of second media items from the first media item respectively. Based on the plurality of templates and the first media item, a plurality of candidate configurations are generated for generating the plurality of second media items, respectively. A plurality of effect evaluations respectively associated with the plurality of candidate configurations are determined. Based on the plurality of effect evaluations, a target template is selected from the plurality of templates for generating the second media item from the first media item. In this way, a plurality of effect evaluations may be used to indicate whether the plurality of candidate second media items to be generated meet the user requirement, thereby improving the efficiency of processing the media item.

20 Claims, 5 Drawing Sheets

(51) Int. Cl.
*G11B 27/036* (2006.01)
*G06V 20/40* (2022.01)

(56) References Cited

U.S. PATENT DOCUMENTS

| | | | | |
|---|---|---|---|---|
| 2019/0095436 | A1* | 3/2019 | Martinazzi | G06T 11/60 |
| 2023/0178114 | A1* | 6/2023 | Biggs | G11B 27/34 |
| | | | | 700/94 |

FOREIGN PATENT DOCUMENTS

| | | | |
|---|---|---|---|
| CN | 114363712 | A | 4/2022 |
| CN | 116186412 | A | 5/2023 |
| CN | 116932787 | A | 10/2023 |
| CN | 117726716 | A | 3/2024 |
| CN | 117749959 | A | 3/2024 |

\* cited by examiner

METHOD, APPARATUS, DEVICE AND MEDIUM FOR PROCESSING MEDIA ITEM

CROSS-REFERENCE TO RELATED APPLICATION

This application claims priority to Patent Application No. PCT/CN2024/097543, filed with the China National Intellectual Property Administration on Jun. 5, 2024, and entitled "METHOD, APPARATUS, DEVICE AND MEDIUM FOR PROCESSING MEDIA ITEM", the disclosure of which is incorporated herein by reference in its entirety.

FIELD

Implementations of the present disclosure generally relate to the field of computers, and in particular, to methods, apparatuses, devices, and computer-readable storage media for processing media items.

BACKGROUND

Various technical solutions have been proposed for generating media items, for example, a user may manually create a media item, edit an existing media item, or invoke a machine learning model to generate a media item, and so on. However, a large number of manual operations are required in the process of processing media items so as to obtain media items that meet user needs. At this point, it may be desirable to process the media items in a simpler and efficient manner to obtain the desired media items.

SUMMARY

In a first aspect of the present disclosure, a method for processing a media item is provided. In the method, a first media item and a plurality of templates are obtained, the plurality of templates being used for generating a plurality of second media items from the first media item respectively. Based on the plurality of templates and the first media item, a plurality of candidate configurations are generated for generating the plurality of second media items, respectively, a candidate configuration of the plurality of candidate configurations indicating a template of the plurality of templates and the first media item. A plurality of effect evaluations respectively associated with the plurality of candidate configurations are determined, an effect evaluation of the plurality of effect evaluations representing an effect evaluation of a second media item that is to be generated from the first media item using the template indicated by the candidate configuration. Based on the plurality of effect evaluations, a target template is selected from the plurality of templates for generating the second media item from the first media item.

In a second aspect of the present disclosure, an apparatus for processing a media item is provided. The apparatus comprises: an obtaining module, configured for obtaining a first media item and a plurality of templates, the plurality of templates being used for generating a plurality of second media items from the first media item respectively; a generating module, configured for determining, based on the plurality of templates and the first media item, a plurality of candidate configurations for generating the plurality of second media items, respectively, a candidate configuration of the plurality of candidate configurations indicating a template of the plurality of templates and the first media item; an evaluation module, configured for determining a plurality of effect evaluations respectively associated with the plurality of candidate configurations, an effect evaluation of the plurality of effect evaluations representing an effect evaluation of a second media item that is to be generated from the first media item using the template indicated by the candidate configuration; and a selecting module, configured for selecting, based on the plurality of effect evaluations, from the plurality of templates a target template for generating the second media item from the first media item.

In a third aspect of the present disclosure, an electronic device is provided. The electronic device comprises: at least one processing unit; and at least one memory, coupled to the at least one processing unit and storing instructions executed by the at least one processing unit, the instructions, when executed by the at least one processing unit, causing the electronic device to perform the method according to the first aspect of the present disclosure.

In a fourth aspect of the present disclosure, a computer-readable storage medium is provided, storing a computer program thereon, the computer program, when executed by a processor, causing the processor to implement the method according to the first aspect of the present disclosure.

In a fifth aspect of the present disclosure, a computer program product is provided, comprising a computer program, wherein the computer program, when executed by a processor, implements the method according to the first aspect of the present disclosure.

It should be understood that what is described in this Summary is not intended to identify key features or essential features of the implementations of the present disclosure, nor is it intended to limit the scope of the present disclosure. Other features disclosed herein will become easily understandable through the following description.

BRIEF DESCRIPTION OF DRAWINGS

The above and other features, advantages, and aspects of the various implementations of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
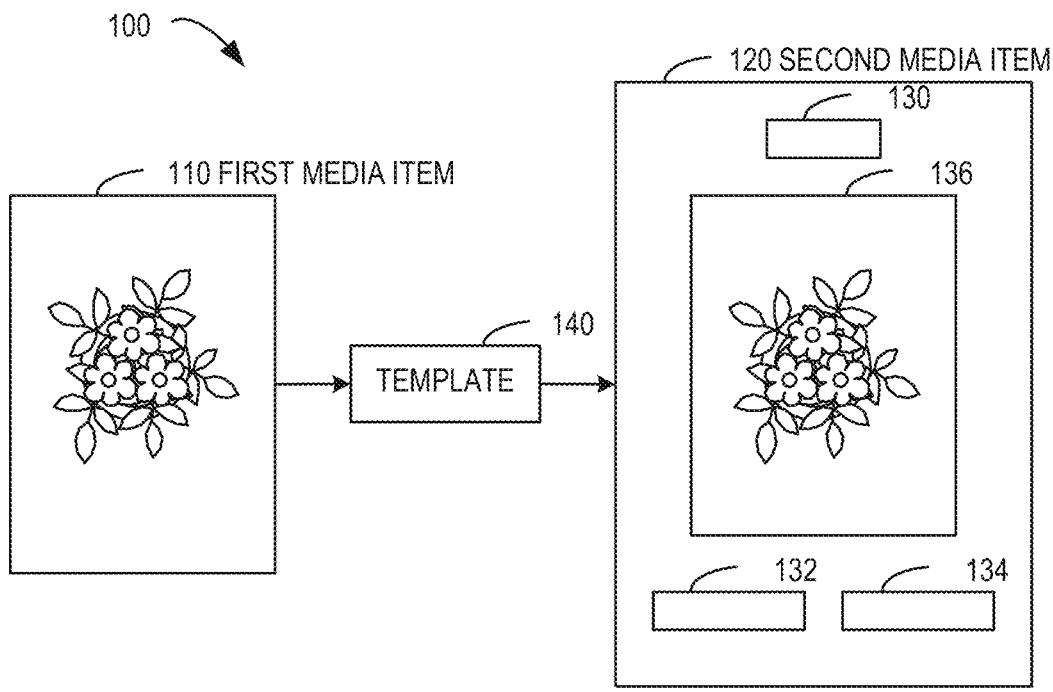
FIG. 1 illustrates a block diagram of a media processing process according to one implementation of the present disclosure.

The implementations of the present disclosure will be described in more detail with reference to the accompanying drawings, in which some implementations of the present disclosure have been illustrated. However, it should be understood that the present disclosure may be implemented in various manners, and thus should not be construed to be limited to implementations disclosed herein. On the contrary, those implementations are provided for the thorough and complete understanding of the present disclosure. It should be understood that the drawings and implementations of the present disclosure are only used for illustration, rather than limiting the protection scope of the present disclosure.

As used herein, the term "comprise" and its variants are to be read as open terms that mean "comprise, but is not limited to." The term "based on" is to be read as "based at least in part on." The term "one implementation" or "the implementation" is to be read as "at least one implementation." The term "some implementations" is to be read as "at least some implementations." Other definitions, explicit and implicit, might be further included below. As used herein, the term "model" may represent associations between respective data. For example, the above association may be obtained based on various technical solutions that are currently known and/or to be developed in future.

It is to be understood that the data involved in this technical solution (including but not limited to the data itself, data acquisition or use) should comply with the requirements of corresponding laws and regulations and relevant provisions.

It is to be understood that, before applying the technical solutions disclosed in respective embodiments of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

As used herein, the term "in response to" indicates a state in which a corresponding event occurs or a condition is satisfied. It is to be understood that the timing of the execution of a subsequent action that is performed in response to the event or condition is not necessarily strongly correlated to the time at which the event or condition occurs or is established. For example, in some cases, the subsequent action may be performed immediately upon occurrence of the event or upon satisfaction of the condition. In other cases, the subsequent action may be performed only after a period of time since the event occurs or the condition is established.

Example Environment

Various technical solutions for processing media items have been proposed, however, a large number of manual operations are required in the process of processing media items in order to obtain the desired media items. FIG. 1 is a block diagram 100 of a media processing process according to some implementations of the present disclosure. In the context of the present disclosure, a specific process of processing a media item will be described as an example of a video as a media item. Alternatively and/or additionally, the media items may comprise other formats, comprising, but not limited to, images, documents comprising text and images, and/or other formats of rich text data.

As shown in FIG. 1, the first media item 110 may be processed using the template 140 to obtain the second media item 120 from the first media item 110. For example, the template 140 may specify one or more media elements to be comprised in the second media item 120. At this time, the generated second media item 120 may comprise richer visual content, such as visual content 130, 132, 134, 136, etc., to carry more information.

Although multiple templates have been currently provided and multiple templates may be utilized to generate multiple second media items, respectively, however, the generation process needs to occupy a large amount of computing resources, and it is necessary to determine whether a plurality of second media items meet user requirements one by one. Further, the generated second media item 120 may possibly not meet the user requirements, which results in the second media item 120 having to be manually edited using the media editing tool, thereby failing to generate media items in a large scale. At this point, it may be desirable to process the media items in a simpler and efficient manner to obtain the desired media items.

Summary of Processing Media Item

In order to at least partially solve the deficiencies in the prior art, according to one implementation of the present disclosure, a method for processing a media item is presented. Generally, multiple templates may be utilized to process the first media item to generate a plurality of effect evaluations of the second media item, respectively. The plurality of effect evaluations may be compared and an effect evaluation matching the user requirements may be selected to process the first media item using a template corresponding to the selected effect evaluation.

Figure 2:
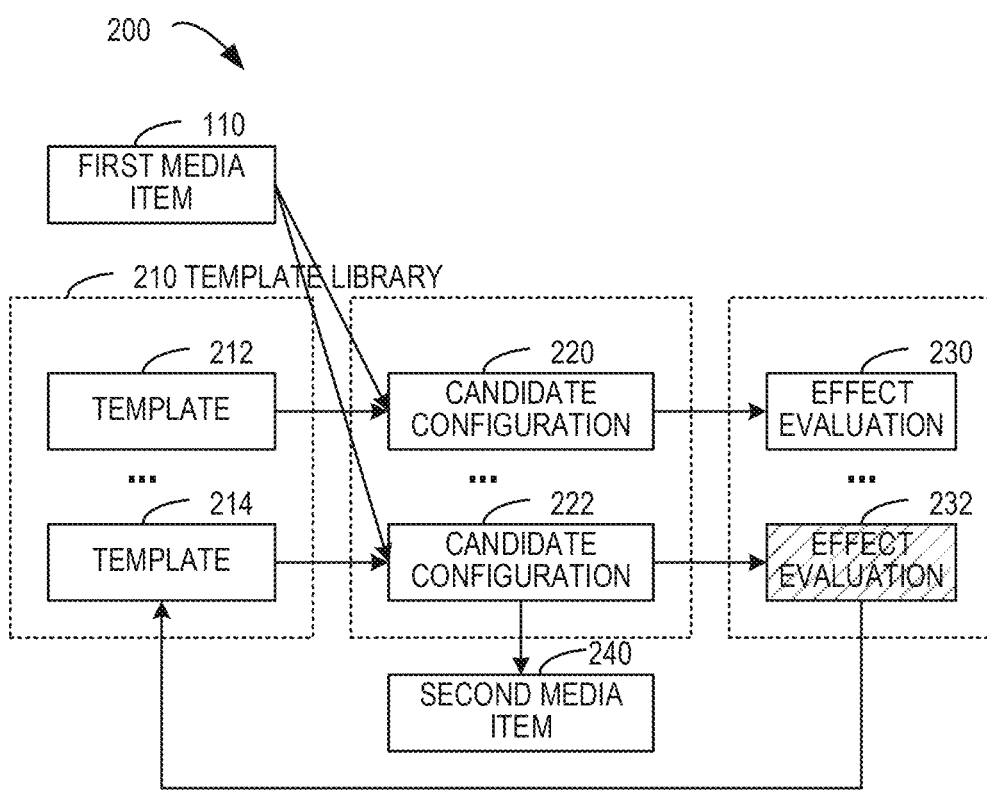
FIG. 2 illustrates a block diagram for processing media items according to some implementations of the present disclosure.

Referring to FIG. 2, a summary is described according to an implementation of the present disclosure, and FIG. 2 illustrates a block diagram 200 for processing a media item according to some implementations of the present disclosure. As shown in FIG. 2, a first media item and a plurality of templates 212, . . . , 214 may be obtained. Here, the plurality of templates may be from a predetermined template library 210, and the plurality of templates 212, . . . , 214 are used to generate a plurality of second media items from the first media item, respectively.

A plurality of candidate configurations 220, . . . , and 222 for respectively generating a plurality of second media items may be determined based on the plurality of templates 212, ..., and 214 and the first media item. A candidate configuration of the plurality of candidate configurations may indicate a template of the plurality of templates and the first media item. For example, the candidate configuration 220 may indicate template 212 and first media item 110, ..., and the candidate configuration 222 may indicate template 214 and first media item 110. At this point, the candidate configuration may indicate the data needed to generate the second media item. For example, the first media item 110 may be processed with the template 212 to generate a second media item; and in another example, the first media item 110 may be processed with the template 214 to generate a second media item.

Further, multiple effect evaluations 230, ..., and 232 associated with multiple candidate configurations may be determined, respectively. An effect evaluation of the plurality of effect evaluations represents an effect evaluation of a second media item to be generated from the first media item using the template indicated by the candidate configuration. For example, effect evaluation 230 represents an effect evaluation of a second media item to be generated from first media item 110 using template 212 indicated by candidate configuration 220, and effect evaluation 232 represents an effect evaluation of a second media item to be generated from first media item 110 using template 214 indicated by candidate configuration 222.

The effect evaluation may be represented in various manners, for example, a continuous numerical value in 0 to 1 (or another range) may be used to represent the effect evaluation, a larger the numerical value indicates a higher matching degree to the user requirement, and a smaller numerical value indicates a lower matching degree to the user requirement. Alternatively and/or additionally, effect evaluation may be represented using a discrete format (e.g., high, medium, and low).

The target template, for generating the second media item from the first media item, may be selected from the plurality of templates 212, ..., and 214 based on the plurality of effect evaluations 230, ..., and 232. The plurality of effect evaluations 230, ..., and 232 may be compared to determine the effect evaluation 232 (e.g., having a maximum value) that is more matched to a user requirement, then a corresponding target template (e.g., the template 214) is selected, and a second media item 240 is generated using the corresponding candidate configuration 222.

With the implementation of the present disclosure, it is unnecessary to actually generate multiple second media items by using multiple templates, but multiple effect evaluations may be used to indicate whether multiple candidate second media items to be generated meet the user requirement, and then a template that is more matched with the user requirement is selected to generate a corresponding second media item. In this way, the computing resource overhead of processing the media item may be greatly reduced, thereby improving the efficiency of processing the media item.

Detailed Procedure for Processing Media Item

Having described a summary of processing media items, more details for processing media items are described below with reference to the drawings. According to some implementations of the present disclosure, the first media item may be obtained in a plurality of manners. Specifically, the first media item may be obtained from a media sharing application (for example, the first media sharing application). It should be appreciated that the media sharing application may comprise a large number of original media items published by a large number of users and provide rich data sources. The first media item may be obtained from the plurality of original media items published by the plurality of users of the first media sharing application, thereby improving the efficiency of acquiring the media item.

According to some implementations of the present disclosure, the first media item is a media segment extracted from the plurality of original media items. For example, in a data promotion scenario, it is assumed that the first media sharing application and/or the media item in the application are expected to be promoted, and all or a part of the original media item may be used as the first media item. Generally, the video published by the user may be long (e.g., 5 minutes, etc.), and the key portion (e.g., 10 seconds, etc.) may be extracted from the video, for example, the content of the original media item may be analyzed by using a machine learning model, and then division and selection processing may be performed on the original media item based on the user requirement, thereby finding a media segment that is more consistent with the user requirements (e.g., attracting more user interests, etc.).

Figure 3:
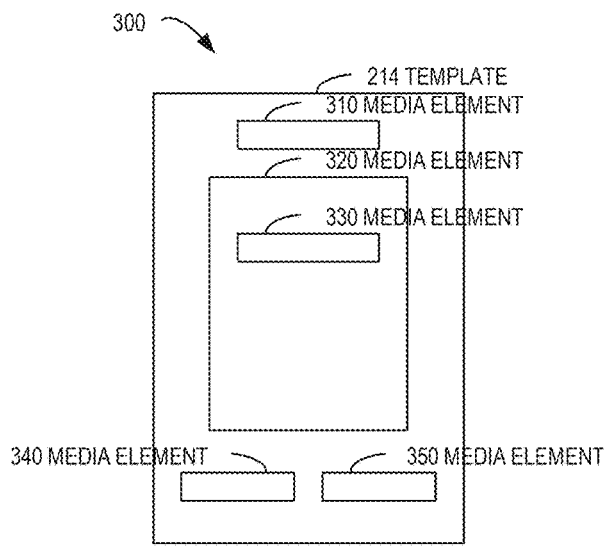
FIG. 3 illustrates a block diagram of a template for generating media items according to some implementations of the present disclosure.

According to some implementations of the present disclosure, a selected template may be utilized to generate the second media item from the first media item, and the template represents a layout of the plurality of media elements to be added into the second media item. Referring to FIG. 3, more information about a template is described, which shows a block diagram 300 of a template for generating media items according to some implementations of the present disclosure. As shown in FIG. 3, the template 214 may comprise a plurality of media elements 310, 320, 330, 340, and 350, and the like.

The template 214 may be represented in a number of ways, for example, an image may be used to represent the template, and multiple regions may be defined in the image to represent multiple media elements, respectively. In another example, the template may be represented using a self-defined format, for example, may be represented in an array manner according to pixel coordinates of a position where the media element is located, and the like.

According to some implementations of the present disclosure, in a process of determining a related effect evaluation of a candidate configuration, a feature associated with the candidate configuration may be determined based on a template and the first media item specified in the candidate configuration. Specifically, features related to the template and related features of the first media item are determined, respectively, and then features of the candidate configuration are determined. More details regarding determining the features and then determining the effect scores are described with reference to FIG. 4, which illustrates a block diagram 400 for determining effect scores for candidate configurations in accordance with some implementations of the present disclosure.

Figure 4:
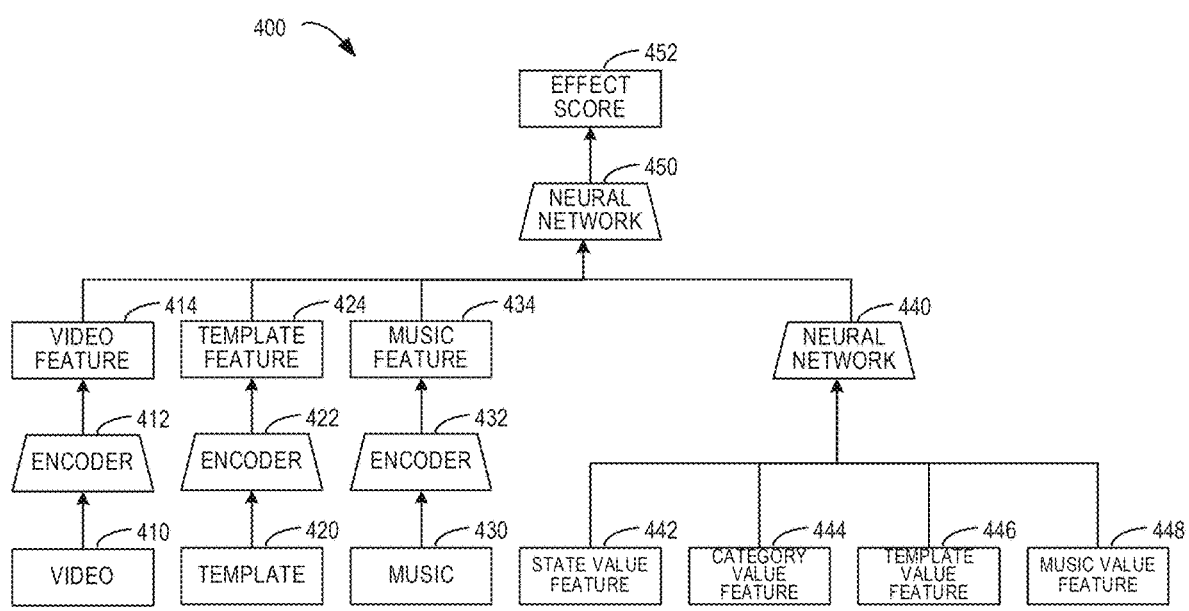
FIG. 4 illustrates a block diagram for determining an effect score of a candidate configuration according to some implementations of the present disclosure.

As shown in FIG. 4, where the first media item is a video 410, the video feature 414 may be extracted with an encoder 412 for extracting video features. In a situation that an image is utilized to represent a template, the template feature 424 may be extracted with an encoder 422 for extracting image features. With the maturity of neural network technologies, neural network technologies may be used to implement calculations on original pictures and video data, generate features, and use the features in the scenarios for analysis, clustering, classification and the like related to the subsequent policy model. Since the video comprises an image frame, the feature information of each image frame may be extracted by using a pre-trained neural network. In particular, a residual network and/or other network may be implemented. Through this step, the original video may be processed into a feature vector represented in N*D, where N represents the frame number of the video, D represents the feature vector dimension of the video, and each image frame corresponds to one feature vector.

Further, the video feature 414 and the template feature 424 may be input to the neural network 450 to determine a corresponding effect score 452. For example, the video features 414 and the template features 424 may be combined to obtain the feature of the candidate configuration, and then the feature is input into the neural network 450. The neural network 450 herein may be a pre-acquired machine learning model. In this way, the powerful processing capability of the machine learning model may be utilized to determine the effect score 452 in a more accurate manner.

According to some implementations of the present disclosure, the machine learning model may be obtained based on a generation purpose of generating the second media item from the first media item. Continuing with the example above, in the scenario of data promotion, it is assumed that the purpose of generating the second media item from the first media item is to let more users access the first media item. In this case, the training data of the machine learning model may be obtained based on the purpose, for example, a first reference media item and a second reference media item leading to more user access amount may be selected. In another example, it is assumed that the purpose of generating the second media item from the first media item is to have more users download the recommended application in the first media item, then first reference media item and the second reference media item leading to more user downloads may be selected, and so on. According to example implementations of the present disclosure, the effect score output by the machine learning model may be more consistent with the generation purpose, so that the second media item generated by the selected template better meets the user requirement.

According to some implementations of the present disclosure, more factors may be considered in generating the features. For example, the candidate configuration may further comprise background audio (e.g., music) for generating the second media item. It should be understood that the background audio herein may represent the audio used to replace the original background audio in the first media item. That is, the second media item generated in this manner may have a new background audio, so that the second media item is more consistent with the requirement.

Specifically, the background audio may be selected from an audio library comprising a plurality of background audio. At this time, the feature of the candidate configuration may be updated by using the feature of the background audio. With continued reference to FIG. 4, music 430 may be selected and the music feature 434 may be extracted by an encoder 432 for extracting music features. Further, the video feature 414, the template feature 424, and the music feature 434 may be input into the neural network 450 to obtain a corresponding effect score 452. In this way, the audio information may be considered in the process of determining the effect score, so that the determined effect score is more accurate.

According to some implementations of the present disclosure, the candidate configuration may further comprise an attribute of the first media item. Here, the attribute may comprise at least one of the following: a state of the first media item, a category of the first media item, a content template of the first media item, and audio of the first media item, and so on. Still referring to FIG. 4, the state value feature 442 may be extracted from the state of the first media item. For the first media item published in the first media sharing application, the state may represent the playing state, the like state, the following state of the first media item and the like. The category value feature 444 may be extracted from the category of the first media item, for example, a category to which the presented content of the first media item belongs, such as a food category, a landscape category, a song category, and the like.

Alternatively and/or additionally, the template value feature 446 may be extracted from the content template of the first media item. Here, the content template refers to a template used in the process of making the first media item (e.g., defining configurations such as a style, a time length, and a shot and the like in the first media item), here the content template is different from the template 214 for generating the second media item. The music value feature 448 may be extracted from the audio of the first media item. Here, the audio of the first media item refers to the audio (e.g., background music) used by the first media item itself, which is different from the music 430 that generated the second media item.

According to some implementations of the present disclosure, the state value feature 442, the category value feature 444, the template value feature 446, and the music value feature 448 may be obtained, and then these features are input to the neural network 440 (for example, for combining and/or dimensions of various features, etc.), to obtain the attribute feature of the first media item. Further, the feature of the candidate configuration is updated by using the attribute feature obtained in the foregoing manner. Specifically, the video feature 414, the template feature 424, the music feature 434, and the attribute feature may be input to the neural network 450 to obtain a corresponding effect score 452. In this way, richer information may be considered in the process of determining the effect score, so that the determined effect score is more accurate.

It should be understood that although FIG. 4 only shows the process of determining the effect score 452 based on the template 420 and the music 430. Alternatively and/or additionally, a predetermined template library and music library may be provided. Each template in the template library may be traversed, and each music in the music library is traversed, thereby determining a plurality of effect scores for the plurality of candidate configurations in a combination way. Assuming that the template library comprises K templates and the music library comprises L pieces of music, K*L candidate configurations and corresponding K*L effect scores may be obtained. The template and music corresponding to the highest effect score may be selected to generate the second media item from the first media item. In this way, it is not necessary to cost a large amount of computing resources to actually generate the K*L second media items, but a template and music leading to a better effect score may be determined by the machine learning model.

In the case where the optimal effect score has been determined, the corresponding second media item may be generated by using the template and music leading to the better effect score. Further details are described with reference to FIG. 5, which illustrates a block diagram 500 for generating media items in accordance with some implementations of the present disclosure. According to some implementations of the present disclosure, the template library 530 may provide a large number of templates, and the music library 510 may provide a large amount of music. Delivery performance for different segments of the original videos in the video library 520 may be different, and the delivery performance of the video may be estimated by using the above machine learning model.

Figure 5:
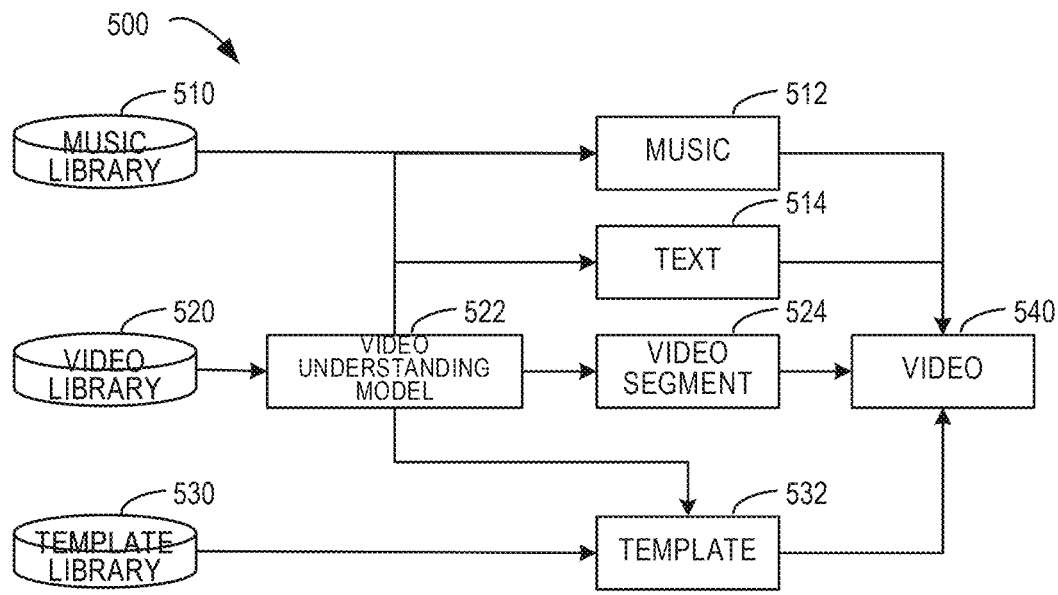
FIG. 5 illustrates a block diagram for generating a media item according to some implementations of the present disclosure.

As shown in FIG. 5, music 512 may be selected from music library 510, video segment 524 may be extracted from video library 520 using video understanding model 522, template 532 may be selected from template library 530, and then video 540 may be generated. Here, the video segment 524 may be a complete video in the video library 520, or may be a segment in the complete video. In this way, the video 540 that is more consistent with the user requirements may be generated. According to some implementations of the present disclosure, the video understanding model 522 may be utilized to generate a corresponding copywriting 514 (e.g., a description of the video segment 524, etc.), thereby adding the copywriting 514 into the video 540.

According to some implementations of the present disclosure, the template may further represent a plurality of association relationships between the plurality of media elements and the plurality of attributes of the first media item. Further, a plurality of attributes may be respectively added to the plurality of positions of the plurality of media elements corresponding to the target template based on the plurality of association relationships to generate the second media item. More information is described with reference to FIG. 6, which illustrates a block diagram 600 of generating a second media item with a template according to some implementations of the present disclosure.

Figure 6:
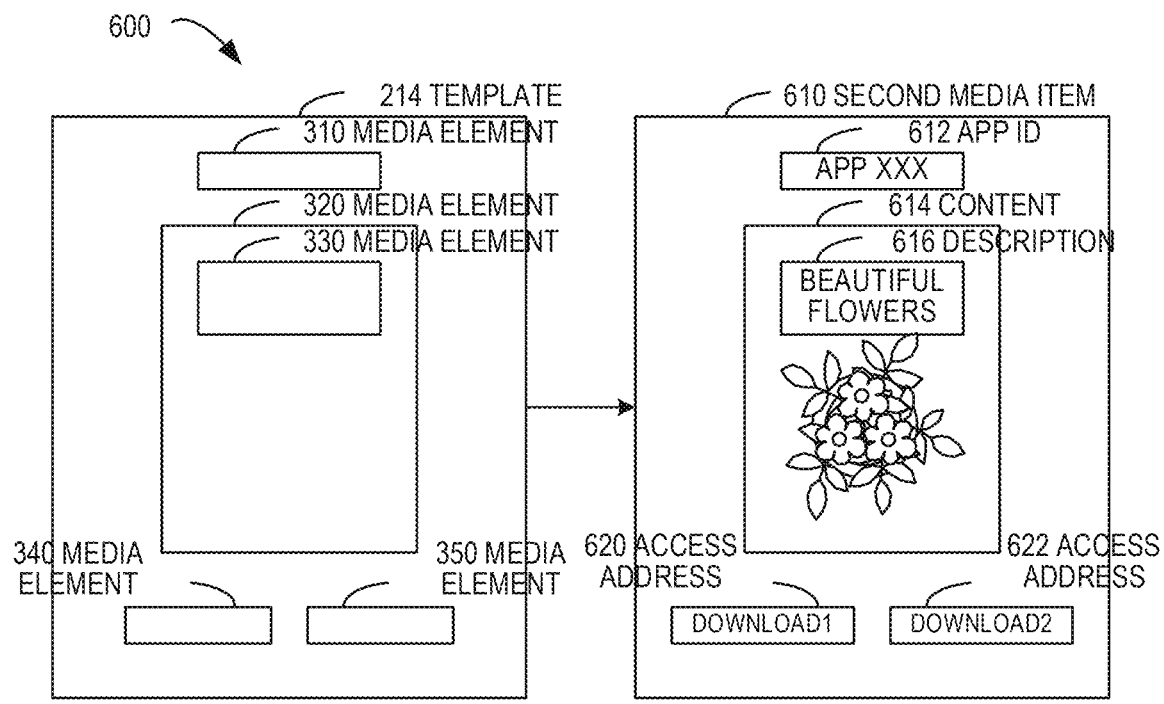
FIG. 6 illustrates a block diagram of generating a second media item with a template according to some implementations of the present disclosure.

As shown in FIG. 6, the plurality of attributes comprise at least one of the following: a content of the first media item, a description of the first media item, an access address of an application used to access the first media item, and an identification of the application. Specifically, a corresponding attribute may be added to a position corresponding to each media element specified in the template 214.

The media element 310 in template 214 may correspond to the identification of the application for accessing the first media item, that is, the application identification 612 may be added to the position of media element 310. The media element 320 may correspond to the content of the first media item, that is, the content 614 may be added to the position of media element 320. The media element 330 may correspond to a description of the first media item, that is, the description 616 may be added to the position of media element 330. The media elements 340 and 350 may correspond to the access address of the application, that is, the access addresses 620 and 622 may be added to the positions of the media elements 340 and 350 respectively (the access address 620 may be used to download an application installed in one operating system, and the access address 622 may be used to download an application installed in another operating system). In this case, the second media item comprises an address used to access the first media sharing application.

With example implementations of the present disclosure, the attributes presented in the second media item and the position at which the attribute is presented may be specified in a more accurate and efficient manner, thereby making the generated second media item more consistent with the user requirement.

According to some implementations of the present disclosure, the description of the first media item is extracted from the first media item. Specifically, the text extracted by the video understanding model 522 shown in FIG. 5 may be used as the description. With example implementations of the present disclosure, the presented description will be more consistent with the original content of the first media item.

According to some implementations of the present disclosure, the second media item may be provided in a second media sharing application different from the first media sharing application. For example, the first media sharing application may be an application for publishing short videos and the second media sharing application may be an application for publishing multimedia data. In this way, more users may be attracted to watch the generated second media items across different applications, thereby improving data promotion efficiency.

In data promotion, high-quality creative materials play a crucial role. The high-quality material may attract the user, so that the user obtains richer information. According to some implementations of the present disclosure, the content suitable for making the material may be searched from the media sharing application for material processing, and finally provided to users.

According to some implementations of the present disclosure, multi-modal technologies and content generation capabilities may be utilized, and high-quality materials may be produced by intelligently editing the original media content. Specifically, the video understanding process may apply multi-modal technology to understand the video, and provide a basis for subsequent content extraction, music recommendation, and template recommendation. The segment extraction process may divide and select the original video to find a suitable video segment. The text generation process may utilize language model to generate appropriate text to match the video content. The music recommendation process may recommend appropriate music for each video content. The template recommendation process may recommend a suitable template for each video content. The final effect estimation process may construct a machine learning model, estimate a final effect for the media item, and select an appropriate material processing mode according to the effect.

With the maturity of multi-modal and large model technologies, a computer vision model may be used to recognize and understand the original user generated content to obtain video understanding information. On the basis of video understanding, videos may be segmented through the multi-modal technology to obtain the atomized content. Meanwhile, suitable text information is processed by using a language model. Music and templates that best match the video may be selected by machine learning. Finally, the content is merged into a final material through the multi-modal technology.

Example Process

Figure 7:
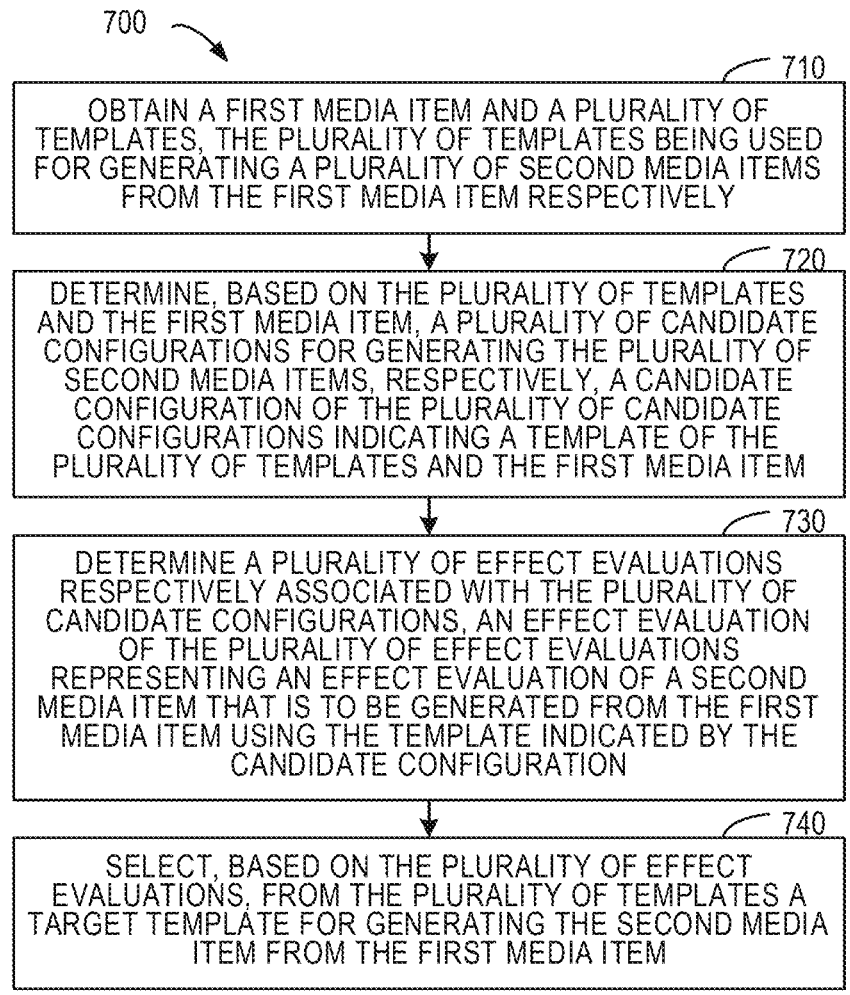
FIG. 7 illustrates a flowchart of a method for processing a media item according to some implementations of the present disclosure.

FIG. 7 shows a flowchart of a method 700 for processing a media item according to some implementations of the present disclosure. At block 710, a first media item and a plurality of templates are obtained, the plurality of templates being used for generating a plurality of second media items from the first media item respectively. At block 720, based on the plurality of templates and the first media item, a plurality of candidate configurations are generated for generating the plurality of second media items, respectively, a candidate configuration of the plurality of candidate configurations indicating a template of the plurality of templates and the first media item. At block 730, a plurality of effect evaluations respectively associated with the plurality of candidate configurations are determined, an effect evaluation of the plurality of effect evaluations representing an effect evaluation of a second media item that is to be generated from the first media item using the template indicated by the candidate configuration. At block 740, based on the plurality of effect evaluations, a target template is selected from the plurality of templates for generating the second media item from the first media item.

According to some implementations of the present disclosure, determining the effect evaluation of the plurality of evaluation effects comprises: determining a feature associated with the candidate configuration based on the template and the first media item; and determining the effect evaluation by using a machine learning model based on the feature.

According to some implementations of the present disclosure, the template represents a layout of a plurality of media elements that are to be added into the second media item, and determining the feature comprises: determining the feature based on a feature of the template and a feature of the first media item.

According to some implementations of the present disclosure, the candidate configuration further comprises background audio for generating the second media item, the background audio being selected from a plurality of background audio, and determining the feature further comprises updating the feature with a feature of the background audio.

According to some implementations of the present disclosure, the candidate configuration further comprises an attribute of the first media item, and determining the feature further comprises: updating the feature with a feature of the attribute, the attribute comprising at least one of: a state of the first media item, a category of the first media item, a content template of the first media item, and audio of the first media item.

According to some implementations of the present disclosure, the machine learning model is obtained based on a generation purpose for generating the second media item from the first media item.

According to some implementations of the present disclosure, the template further represents a plurality of association relationships between the plurality of media elements and a plurality of attributes of the first media item, and the method further comprises: generating the second media item by adding, based on the plurality of association relationships, the plurality of attributes into a plurality of positions corresponding to a plurality of media elements of the target template, respectively.

According to some implementations of the present disclosure, the plurality of attributes comprises at least one of the first media item: content of the first media item, a description of the first media item, an access address of an application for accessing the first media item, and an identification of the application.

According to some implementations of the present disclosure, the description of the first media item is extracted from the first media item.

According to some implementations of the present disclosure, obtaining the first media item comprises: obtaining the first media item from a plurality of original media items published by a plurality of users of a first media sharing application, and the method further comprising: providing the second media item in a second media sharing application.

According to some implementations of the present disclosure, the first media item is a media segment extracted from the plurality of original media items.

Example Apparatus and Device

Figure 8:
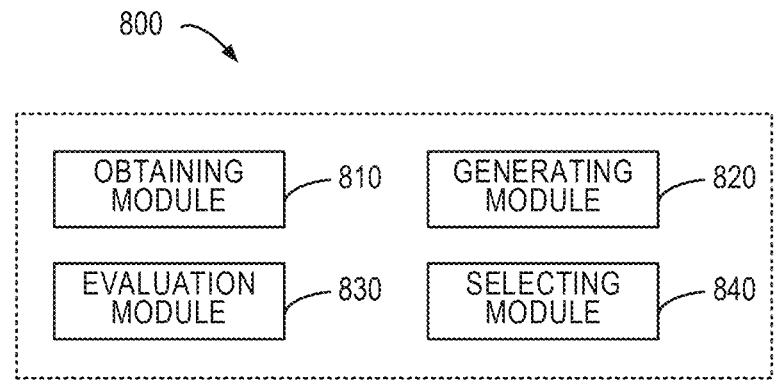
FIG. 8 illustrates a block diagram of an apparatus for processing media items according to some implementations of the present disclosure.

FIG. 8 shows a block diagram of an apparatus 800 for processing a media item according to some implementations of the present disclosure. The apparatus 800 comprises: an obtaining module 810, configured for obtaining a first media item and a plurality of templates, the plurality of templates being used for generating a plurality of second media items from the first media item respectively; a generating module 820, configured for determining, based on the plurality of templates and the first media item, a plurality of candidate configurations for generating the plurality of second media items, respectively, a candidate configuration of the plurality of candidate configurations indicating a template of the plurality of templates and the first media item; an evaluation module 830, configured for determining a plurality of effect evaluations respectively associated with the plurality of candidate configurations, an effect evaluation of the plurality of effect evaluations representing an effect evaluation of a second media item that is to be generated from the first media item using the template indicated by the candidate configuration; and a selecting module 840, configured for selecting, based on the plurality of effect evaluations, from the plurality of templates a target template for generating the second media item from the first media item.

According to some implementations of the present disclosure, the evaluation module comprises: a feature determining module, configured for determining a feature associated with the candidate configuration based on the template and the first media item; and a calling module, configured for determining the effect evaluation by using a machine learning model based on the feature.

According to some implementations of the present disclosure, the template represents a layout of a plurality of media elements that are to be added into the second media item, and the feature determining module comprises: a combination module, configured for determining the feature based on a feature of the template and a feature of the first media item.

According to some implementations of the present disclosure, the candidate configuration further comprises background audio for generating the second media item, the background audio being selected from a plurality of background audio, and the feature determining module further comprises: an updating module, configured for updating the feature with a feature of the background audio.

According to some implementations of the present disclosure, the candidate configuration further comprises an attribute of the first media item, and the feature determining module further comprises: an updating module, configured for updating the feature with a feature of the attribute, the attribute comprising at least one of: a state of the first media item, a category of the first media item, a content template of the first media item, and audio of the first media item.

According to some implementations of the present disclosure, the machine learning model is obtained based on a generation purpose for generating the second media item from the first media item.

According to some implementations of the present disclosure, the template further represents a plurality of association relationships between the plurality of media elements and a plurality of attributes of the first media item, and the apparatus further comprises: an adding module, configured for generating the second media item by adding, based on the plurality of association relationships, the plurality of attributes into a plurality of positions corresponding to a plurality of media elements of the target template, respectively.

According to some implementations of the present disclosure, the plurality of attributes comprises at least one of the first media item: content of the first media item, a description of the first media item, an access address of an application for accessing the first media item, and an identification of the application.

According to some implementations of the present disclosure, the description of the first media item is extracted from the first media item.

According to some implementations of the present disclosure, the obtaining module comprises: an extracting module, configured for obtaining the first media item from a plurality of original media items published by a plurality of users of a first media sharing application, and the apparatus further comprising: a providing module, configured for providing the second media item in a second media sharing application.

According to some implementations of the present disclosure, the first media item is a media segment extracted from the plurality of original media items.

Figure 9:
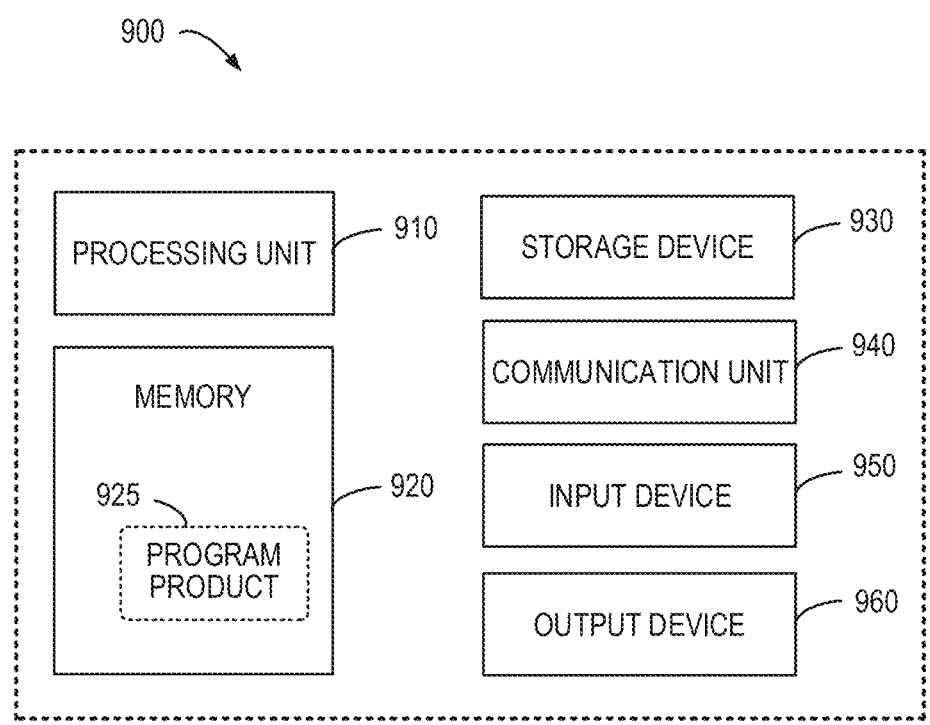
FIG. 9 illustrates a block diagram of a device capable of implementing various implementations of the present disclosure.

FIG. 9 illustrates a block diagram of a device 900 that can implement a plurality of implementations of the present disclosure. It should be understood that the computing device 900 shown in FIG. 9 is only exemplary and shall not constitute any limitation on the functions and scope of the implementations described herein. The computing device 900 shown in FIG. 9 can be used to implement the method described above.

As shown in FIG. 9, the computing device 900 is in the form of a general purpose computing device. Components of the computing device 900 may include, but are not limited to, one or more processors or processing units 910, a memory 920, a storage device 930, one or more communication units 940, one or more input devices 950, and one or more output devices 960. The processing unit 910 may be a physical or virtual processor and may execute various processing based on the programs stored in the memory 920. In a multi-processor system, a plurality of processing units executes computer-executable instructions in parallel to enhance parallel processing capability of the computing device 900.

The computing device 900 usually includes a plurality of computer storage mediums. Such mediums may be any attainable medium accessible by the computing device 900, including but not limited to, a volatile and non-volatile medium, a removable and non-removable medium. The memory 920 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash, or any combination thereof. The storage device 930 may be a removable or non-removable medium, and may include a machine-readable medium (e.g., a memory, a flash drive, a magnetic disk) or any other medium, which may be used for storing information and/or data (e.g., training data for training) and be accessed within the computing device 900.

The computing device 900 may further include additional removable/non-removable, volatile/non-volatile storage mediums. Although not shown in FIG. 10, there may be provided a disk drive for reading from or writing into a removable and non-volatile disk (e.g., "floppy disk") and an optical disc drive for reading from or writing into a removable and non-volatile optical disc. In such cases, each drive may be connected to a bus (not shown) via one or more data medium interfaces. The memory 920 may include a computer program product 925 having one or more program modules, and these program modules are configured for performing various methods or acts of various implementations of the present disclosure.

The communication unit 940 implements communication with another computing device via a communication medium. Additionally, functions of components of the computing device 900 may be realized by a single computing cluster or a plurality of computing machines, and these computing machines may communicate through communication connections. Therefore, the computing device 900 may operate in a networked environment using a logic connection to one or more other servers, a Personal Computer (PC) or a further general network node.

The input device 950 may be one or more various input devices, such as a mouse, a keyboard, a trackball, a voice-input device, and the like. The output device 960 may be one or more output devices, e.g., a display, a loudspeaker, a printer, and so on. The computing device 900 may also communicate through the communication unit 940 with one or more external devices (not shown) as required, where the external device, e.g., a storage device, a display device, and so on, communicates with one or more devices that enable users to interact with the computing device 900, or with any device (such as a network card, a modem, and the like) that enable the computing device 900 to communicate with one or more other computing devices. Such communication may be executed via an Input/Output (I/O) interface (not shown).

According to the example implementations of the present disclosure, a computer-readable storage medium is provided, on which computer-executable instructions are stored, wherein the computer-executable instructions are executed by a processor to implement the method described above. According to the example implementations of the present disclosure, a computer program product is further provided, which is tangibly stored on a non-transient computer-readable medium and includes computer-executable instructions, which are executed by a processor to implement the method described above. According to the example implementations of the present disclosure, a computer program product is provided, storing a computer program thereon, the program, when executed by a processor, implementing the method described above.

Aspects of the present disclosure are described herein with reference to flowchart illustrations and/or block diagrams of methods, apparatus (systems), and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

The invention claimed is:

1. A method for processing a media item, comprising:
   obtaining a first media item and a plurality of templates, the plurality of templates being used for generating a plurality of second media items from the first media item respectively;
   determining, based on the plurality of templates and the first media item, a plurality of candidate configurations for generating the plurality of second media items, respectively, a candidate configuration of the plurality of candidate configurations indicating a template of the plurality of templates and the first media item;
   determining a plurality of effect evaluations respectively associated with the plurality of candidate configurations, an effect evaluation of the plurality of effect evaluations representing an effect evaluation of a second media item that is to be generated from the first media item using the template indicated by the candidate configuration; and
   selecting, based on the plurality of effect evaluations, from the plurality of templates a target template for generating the second media item from the first media item.

2. The method of claim 1, wherein determining the effect evaluation of the plurality of evaluation effects comprises:
   determining a feature associated with the candidate configuration based on the template and the first media item; and
   determining the effect evaluation by using a machine learning model based on the feature.

3. The method of claim 2, wherein the template represents a layout of a plurality of media elements that are to be added into the second media item, and determining the feature comprises: determining the feature based on a feature of the template and a feature of the first media item.

4. The method of claim 2, wherein the candidate configuration further comprises background audio for generating the second media item, the background audio being selected from a plurality of background audio, and determining the feature further comprises updating the feature with a feature of the background audio.

5. The method of claim 2, wherein the candidate configuration further comprises an attribute of the first media item, and determining the feature further comprises: updating the feature with a feature of the attribute, the attribute comprising at least one of: a state of the first media item, a category of the first media item, a content template of the first media item, and audio of the first media item.

6. The method of claim 2, wherein the machine learning model is obtained based on a generation purpose for generating the second media item from the first media item.

7. The method of claim 3, wherein the template further represents a plurality of association relationships between the plurality of media elements and a plurality of attributes of the first media item, and the method further comprises: generating the second media item by adding, based on the plurality of association relationships, the plurality of attributes into a plurality of positions corresponding to a plurality of media elements of the target template, respectively.

8. The method of claim 7, wherein the plurality of attributes comprises at least one of the first media item: content of the first media item, a description of the first media item, an access address of an application for accessing the first media item, and an identification of the application.

9. The method of claim 8, wherein the description of the first media item is extracted from the first media item.

10. The method of claim 7, wherein obtaining the first media item comprises: obtaining the first media item from a plurality of original media items published by a plurality of users of a first media sharing application, and the method further comprising: providing the second media item in a second media sharing application.

11. The method of claim 10, wherein the first media item is a media segment extracted from the plurality of original media items.

12. An electronic device comprises:
    at least one processing unit; and
    at least one memory coupled to the at least one processing unit and storing instructions executed by the at least one processing unit, the instructions, when executed by the at least one processing unit, causing the electronic device to perform a method for processing a media item, comprising:
    obtaining a first media item and a plurality of templates, the plurality of templates being used for generating a plurality of second media items from the first media item respectively;
    determining, based on the plurality of templates and the first media item, a plurality of candidate configurations for generating the plurality of second media items, respectively, a candidate configuration of the plurality of candidate configurations indicating a template of the plurality of templates and the first media item;

determining a plurality of effect evaluations respectively associated with the plurality of candidate configurations, an effect evaluation of the plurality of effect evaluations representing an effect evaluation of a second media item that is to be generated from the first media item using the template indicated by the candidate configuration; and selecting, based on the plurality of effect evaluations, from the plurality of templates a target template for generating the second media item from the first media item.

13. The device of claim 12, wherein determining the effect evaluation of the plurality of evaluation effects comprises:

determining a feature associated with the candidate configuration based on the template and the first media item; and determining the effect evaluation by using a machine learning model based on the feature.

14. The device of claim 13, wherein the template represents a layout of a plurality of media elements that are to be added into the second media item, and determining the feature comprises: determining the feature based on a feature of the template and a feature of the first media item.

15. The device of claim 13, wherein the candidate configuration further comprises background audio for generating the second media item, the background audio being selected from a plurality of background audio, and determining the feature further comprises updating the feature with a feature of the background audio.

16. The device of claim 13, wherein the candidate configuration further comprises an attribute of the first media item, and determining the feature further comprises: updating the feature with a feature of the attribute, the attribute comprising at least one of: a state of the first media item, a category of the first media item, a content template of the first media item, and audio of the first media item.

17. The device of claim 13, wherein the machine learning model is obtained based on a generation purpose for generating the second media item from the first media item.

18. The device of claim 14, wherein the template further represents a plurality of association relationships between the plurality of media elements and a plurality of attributes of the first media item, and the method further comprises:

generating the second media item by adding, based on the plurality of association relationships, the plurality of attributes into a plurality of positions corresponding to a plurality of media elements of the target template, respectively.

19. The device of claim 18, wherein the plurality of attributes comprises at least one of the first media item: content of the first media item, a description of the first media item, an access address of an application for accessing the first media item, and an identification of the application.

20. A non-transitory computer-readable storage medium, storing a computer program thereon, the computer program, when executed by a processor, causing the processor to implement a method for processing a media item, comprising:

obtaining a first media item and a plurality of templates, the plurality of templates being used for generating a plurality of second media items from the first media item respectively;

determining, based on the plurality of templates and the first media item, a plurality of candidate configurations for generating the plurality of second media items, respectively, a candidate configuration of the plurality of candidate configurations indicating a template of the plurality of templates and the first media item;

determining a plurality of effect evaluations respectively associated with the plurality of candidate configurations, an effect evaluation of the plurality of effect evaluations representing an effect evaluation of a second media item that is to be generated from the first media item using the template indicated by the candidate configuration; and selecting, based on the plurality of effect evaluations, from the plurality of templates a target template for generating the second media item from the first media item.

* * * * *